United States Patent
Mignano

(10) Patent No.: US 12,071,310 B2
(45) Date of Patent: Aug. 27, 2024

(54) CONVEYOR SYSTEM AND METHOD OF OPERATING THE SAME

(71) Applicant: OCM S.P.A., Sorbolo Mezzani (IT)

(72) Inventor: Paolo Mignano, Novara (IT)

(73) Assignee: Material Handling Systems, Inc., Mt. Washington (KY)

( * ) Notice: Subject to any disclaimer, the term of this patent is extended or adjusted under 35 U.S.C. 154(b) by 115 days.

(21) Appl. No.: 17/760,958

(22) PCT Filed: Sep. 25, 2020

(86) PCT No.: PCT/EP2020/077005
§ 371 (c)(1),
(2) Date: Mar. 16, 2022

(87) PCT Pub. No.: WO2021/058801
PCT Pub. Date: Apr. 1, 2021

(65) Prior Publication Data
US 2022/0340369 A1    Oct. 27, 2022

(30) Foreign Application Priority Data
Sep. 27, 2019    (IT) .......................... 102019000017447

(51) Int. Cl.
*B65G 43/02*    (2006.01)
*B65G 17/34*    (2006.01)
*B65G 47/52*    (2006.01)

(52) U.S. Cl.
CPC ............ *B65G 43/02* (2013.01); *B65G 17/345* (2013.01); *B65G 47/52* (2013.01);
(Continued)

(58) Field of Classification Search
CPC ...... B65G 43/02; B65G 17/345; B65G 47/52; B65G 2203/0275; B65G 2203/042;
(Continued)

(56) References Cited

U.S. PATENT DOCUMENTS

| | | | |
|---|---|---|---|
| 11,807,464 B2 * | 11/2023 | Borghi | G01M 99/005 |
| 2019/0163170 A1 * | 5/2019 | Hsu | H01L 21/6773 |
| 2022/0289492 A1 * | 9/2022 | Hsu | B61B 3/00 |

FOREIGN PATENT DOCUMENTS

| | | | |
|---|---|---|---|
| CN | 102213963 A | | 10/2011 |
| CN | 108919705 A | | 11/2018 |
| JP | 2018122988 A | * | 8/2018 |

OTHER PUBLICATIONS

JP2018122988A Sorting Conveyer Description Translation (Year: 2023).*

(Continued)

*Primary Examiner* — Mark A Deuble
(74) *Attorney, Agent, or Firm* — Stites & Harbison, PLLC; David W. Nagle, Jr.; James R. Hayne

(57) ABSTRACT

A conveyor system includes a rail that supports multiple carts that move along a track of the conveyor system. A plurality of sensors is operably connected to the rail and configured to measure vibrations of the rail as the carts move along the track. One or more sensors are operably connected to the cart and configured to take measurements of the cart as the cart moves along the track. A central controller collects data from sensors, and a processor analyzes the data to determine whether the data is within a predetermined range that corresponds to normal operation of the conveyor system. A method of operating the conveyor system includes moving the multiple carts along the rail and collecting data from the sensors. The data is analyzed to determine if it is within a predetermined range.

15 Claims, 10 Drawing Sheets

(52) U.S. Cl.
CPC ............... *B65G 2203/0275* (2013.01); *B65G 2203/042* (2013.01); *B65G 2207/40* (2013.01)

(58) Field of Classification Search
CPC .......................... B65G 2207/40; B65G 47/96; G05B 19/0428; G05B 2219/2621; G05B 2219/37351; G05B 23/0213
USPC .......................................... 198/370.01–370.1
See application file for complete search history.

(56) References Cited

OTHER PUBLICATIONS

CN108919705A Rail locomotive intelligent driving auxiliary system Description Translation (Year: 2023).*
Classification conveyor for driving conveyance trolley along loop-form traveling route, whose drivemotor operation is managed by calculating, storing and reading for every conveyor for cloth sorters: Abstract and Claims (Year: 2018).*
Canadian Intellectual Property Office, Examiner's Report issued in corresponding Application No. 3,155,156, dated Jun. 1, 2023.
China National Intellectual Property Administration, Office Action issued in corresponding Application No. 202080067843.7, mailed Jul. 26, 2023.

* cited by examiner

CONVEYOR SYSTEM AND METHOD OF OPERATING THE SAME

TECHNICAL FIELD

The present invention relates to a conveyor system that includes multiple carts that move along a track to deliver parcels to designated areas along the track.

BACKGROUND OF THE INVENTION

Cross-belt conveyor systems include multiple carts that move along a track. Each cart includes its own individual belt conveyor so that parcels on the cart can be moved to the left or right as the cart moves along the track. With so many moving parts, it is inevitable that mechanical faults will occur from time to time. As the length of conveyor systems increases, it not only increases the probability of a mechanical fault, but increases the difficult in determining the location of the mechanical fault. Mechanical switches have been used to detect a collision or other anomaly, but these switches are limited in the amount of information that can be provided.

SUMMARY OF THE INVENTION

The present invention is a cross-belt conveyor system that includes sensors which are used to identify an anomaly in the conveyor system.

An exemplary conveyor system made in accordance with the present invention comprises a track which includes a variety of turns and changes in elevation. The conveyor system further includes multiple carts that move along the track and one or more feeder belts that provide parcels onto the carts. The carts then deposit these parcels into one or more sorter bins.

An exemplary cart includes a base with a belt conveyor connected to the top of the base. The belt conveyor includes rollers and a belt which operate in a direction perpendicular to the direction of travel of the base along the track. As such, while the cart moves along the track, the conveyor can readily accept parcels from the feeder belts on either side of the cart and deposit the parcels into the sorter bins on either side of the cart.

The carts are each connected by a spherical, or ball, joint which allows for rotation of one cart relative to an adjacent cart in three axis of rotation in order for the carts to navigate the turns and changes in elevation of the track.

The cart further includes vertical wheels and horizontal wheels which engage the track. In particular, the track includes a first (or inner) rail and a second (or outer) rail which run parallel to one another. A first set of wheels engages the first rail and a second set of wheels similarly engages the second rail. In this way, the cart is supported by the rails as it moves along the track. Each of the first and second rails is supported by a support frame.

The track further includes a plurality of track sensors operably connected to the first rail, the second rail, or both the first rail and the second rail. The position of the track sensors along the track is not limited as the track sensors can be positioned on straight sections of the track, curved sections of the track, and inclined sections of the track. The track sensors are not only able to measure vibrations of the rail that the track sensor is connected to but also to the other rail. As previously mentioned, the first and second rails are supported by a support frame. The support frame provides sufficient mechanical connection between the first rail and the second rail that vibrations originating on one rail will transfer to the other rail. Furthermore, in some embodiments, the track sensors are operably connected to the support frame itself in a location between the two rails.

In any event, the track sensors are preferably spaced along the track in substantially equal intervals. Regardless of the number or placement of the track sensors, it is contemplated that the track sensors are preferably able to monitor vibrations along the entire length of the track.

The exemplary conveyor system further includes a central controller that receives and collects data from the plurality of track sensors. In particular the central controller includes a transceiver to send and receive data between the track sensors and the central controller and a processor which then analyzes the data, as discussed further below. In some embodiments, the conveyor system includes multiple controllers with each of the controllers collecting data from a specific subset of track sensors.

The exemplary cart further includes one or more cart sensors. One exemplary cart sensor is a tri-axial accelerometer which measures acceleration, or G-forces, experienced by the cart. Another exemplary cart sensor is a force sensor positioned at the joint between two adjacent carts to measure the thrust forces experienced at the joint. For example, multiple strain gauges can be positioned around the joint to acquire the thrust forces experienced at the joint in all directions (e.g., longitudinal, lateral, vertical, and any combination thereof). Yet another exemplary cart sensor is a gyroscope configured to measure the oscillation of the cart.

The exemplary cart further includes an on-board controller (OBC) that collects data from the one or more cart sensors. A transceiver is used to send and receive information between the OBC and the central controller.

In one exemplary implementation of operating the conveyor system of the present invention, a test cart is positioned on the track and moved along the track. In some embodiments, the test cart is substantially identical to other carts but includes additional testing equipment which is not provided on the carts during normal operation. As such, providing the test cart is accomplished by simply placing the testing equipment on one or more of the carts of the conveyor system.

While the test cart moves along the track, data from the track sensors on the first and second rails of the track is received and collected by the central controller.

The data from the track sensors is then analyzed by the processor. In particular, a predetermined range of frequencies of vibrations of the track (i.e., the first and second rails) caused by the test cart moving along the track under normal operation is determined. The particular range of frequencies caused by the test cart moving along the track under normal operation can differ depending on the location of the cart along the track. As such, a different predetermined range of frequencies of vibrations of the track can be established for various portions of the track, such as straight portions of the track, curved portions of the track, and inclined portions of the track. Each of the track sensors remains in substantially the same location along the track, and so, for each track sensor, a predetermined range of frequencies of vibrations of the track caused by the test cart moving along the track under normal operation is determined. In other words, every track sensor may have its own predetermined range of frequencies of vibrations of the track caused by the test cart moving along the track under normal operation.

For each of the track sensors, the predetermined range of frequencies of vibrations of the track caused by the test cart moving along the track under normal operation is then stored as normal operating parameters in a database. This database may be part of the central controller or located separate from the central controller and in communication with the central controller. For example, in some embodiments, the database is part of the track sensors themselves and the normal operating parameters for each track sensor are stored directly in the track sensor.

The test cart is then removed, and one or more operational carts are positioned on the track. In embodiments where the test cart is substantially identical to the operational carts but includes additional testing equipment, removing the test cart is accomplished by simply removing the testing equipment from the cart.

The one or more operational carts are then moved along the track in normal operation of the conveyor system. While the operational carts move along the track, data from the track sensors on the first and second rails of the track is received and collected by the central controller.

The data from the track sensors is then analyzed by the processor to determine the current operating parameters for each of the track sensors.

The normal operating parameters for each of the track sensors is compared to the current operating parameters for each of the track sensors to determine whether the current operating parameters are in range of the normal operating parameters, and therefore, whether the conveyor system is operating normally.

If the current operating parameters are in range of the normal operating parameters, then data continues to be collected from the track sensors and analyzed as described above.

However, if the current operating parameters are not in range of the normal operating parameters, then an anomaly in the conveyor system is identified by the processor. For example, in some exemplary implementations of the present invention, when the vibrations of the track are outside of the predetermined range, at least one of the operational carts is presumed to have experienced a mechanical fault. One such mechanical fault is a sudden impact experienced by the operational cart. For example, some exemplary mechanical faults which can be detected include an impact of an external object and the operational cart, an external object and the track, an impact between two adjacent operational carts, or a fault with the wheel of the cart. Furthermore, depending on which of the track sensors are reporting vibrations outside of the range of the normal operating parameters, the processor is able to determine a location of the mechanical fault. For example, if two track sensors both indicate that a mechanical fault has occurs, the processor can determine that the mechanical fault occurred in an area of the track between these two track sensors.

After identifying an anomaly in the conveyor system, the operation of the conveyor system is modified to correct or mitigate the issue. In some embodiments, the processor reports the anomaly to a user, for example with an alert on a display. The user can then modify operation of the conveyor system as needed. In some other embodiments, the processor provides control signals to automatically correct operation and maintain safe operation of the conveyor system.

In another exemplary implementation of operating the conveyor system of the present invention, a test cart is positioned on the track and moved along the track. As mentioned above, in some embodiments, the test cart is substantially identical to other carts but includes additional testing equipment which is not provided on the carts during normal operation. In particular, the test cart preferably includes as cart sensors at least the accelerometer, strain gauges, and gyroscope previously mentioned.

While the test cart moves along the track, data from the cart sensors on the test cart is collected. In particular, the accelerometer measures acceleration experienced by the cart, the strain gauges measures the thrust forces experienced at the joint as the cart is accelerated up to a maximum speed, and the gyroscope measures the oscillation of the cart. The data from the cart sensors as the test cart moves along the track is collected and received by the OBC. The data is then transmitted via the transceiver and received by the central controller.

The data from the cart sensors is then analyzed by the processor. In particular, a predetermined range of acceleration forces experienced by the test cart is determined based on the data collected from the accelerometer cart sensor. Likewise, a predetermined range of thrust forces experienced at the joint of the test cart is determined based on the data collected from the strain gauge cart sensors, and a predetermined range of oscillations of the test cart is determined based on the data collected from the gyroscope cart sensor.

The results of the analysis is then stored as normal operating parameters in the OBC of each of the operational carts. That is to say, once the processor has determined the normal operating parameters of the test cart, the normal operating parameters are transmitted to the OBC of each of the operational carts via the transceivers.

The test cart is then removed, and one or more operational carts are positioned on the track. In some embodiments, each of the operational carts still includes at least the accelerometer cart sensor and the gyroscope cart sensor, but only a first operational cart of the conveyor system includes the strain gauge cart sensors at the joint between the first operational cart and a second, successive operational cart.

The one or more operational carts are then moved along the track in normal operation of the conveyor system and data from the cart sensors on the operational carts is collected. More specifically, as the operational carts move along the track, data from the cart sensors is collected and received by the OBC.

For each of the operational carts, the data from the cart sensors is then analyzed by the OBC to determine the current operating parameters of the cart.

The OBC compares the current operating parameters of the cart with the normal operating parameters determined in step and stored in the OBC to determine whether the current operating parameters are in range of the normal operating parameters, and therefore, whether the conveyor system is operating normally. In other words, the OBC collects data from the one or more cart sensors to determine whether measurements taken of the operational cart as the operational cart moves along the track are within a predetermined range of values that corresponds to normal operation of the conveyor system.

In particular, the OBC compares the analyzed acceleration forces from the accelerometer cart sensor of the operational cart with the predetermined range of acceleration forces stored in the OBC from analysis of the test cart to determine whether the acceleration forces are within the predetermined range of acceleration forces of the cart. Likewise, the OBC compares the analyzed oscillations experienced by the operational cart from the gyroscope cart sensor of the operational cart with the predetermined range of oscillations stored in the OBC from analysis of the test cart to determine whether the oscillations are within the predetermined range of oscillations of the operational cart. Also, the OBC of the first operational cart compares the analyzed thrust forces experienced at the joint of the first operational cart from the strain gauge cart sensors of the first operational cart with the predetermined range of thrust forces stored in the OBC from analysis of the test cart to determine whether the thrust forces are within the predetermined range of thrust forces of the operational cart.

If the current operating parameters are in range of the normal operating parameters, then data continues to be collected from the cart sensors and analyzed as described above.

If the current operating parameters are not in range of the normal operating parameters, an anomaly in the conveyor system is identified. In some embodiments, when the OBC determines that the current operating parameters are not in range of the normal operating parameters, the OBC communicates via the transceiver with the central controller and the anomaly is identified by the processor. In other embodiments, the OBC identifies the anomaly.

After identifying an anomaly in the conveyor system, the operation of the conveyor system is modified to correct or mitigate the issue in substantially the same manner as described above.

DESCRIPTION OF THE INVENTION

The present invention relates to a conveyor system that includes multiple carts that move along a track, for example, a cross-belt conveyor system. The system includes sensors which are used to identify an anomaly in the conveyor system.

Figure 1:
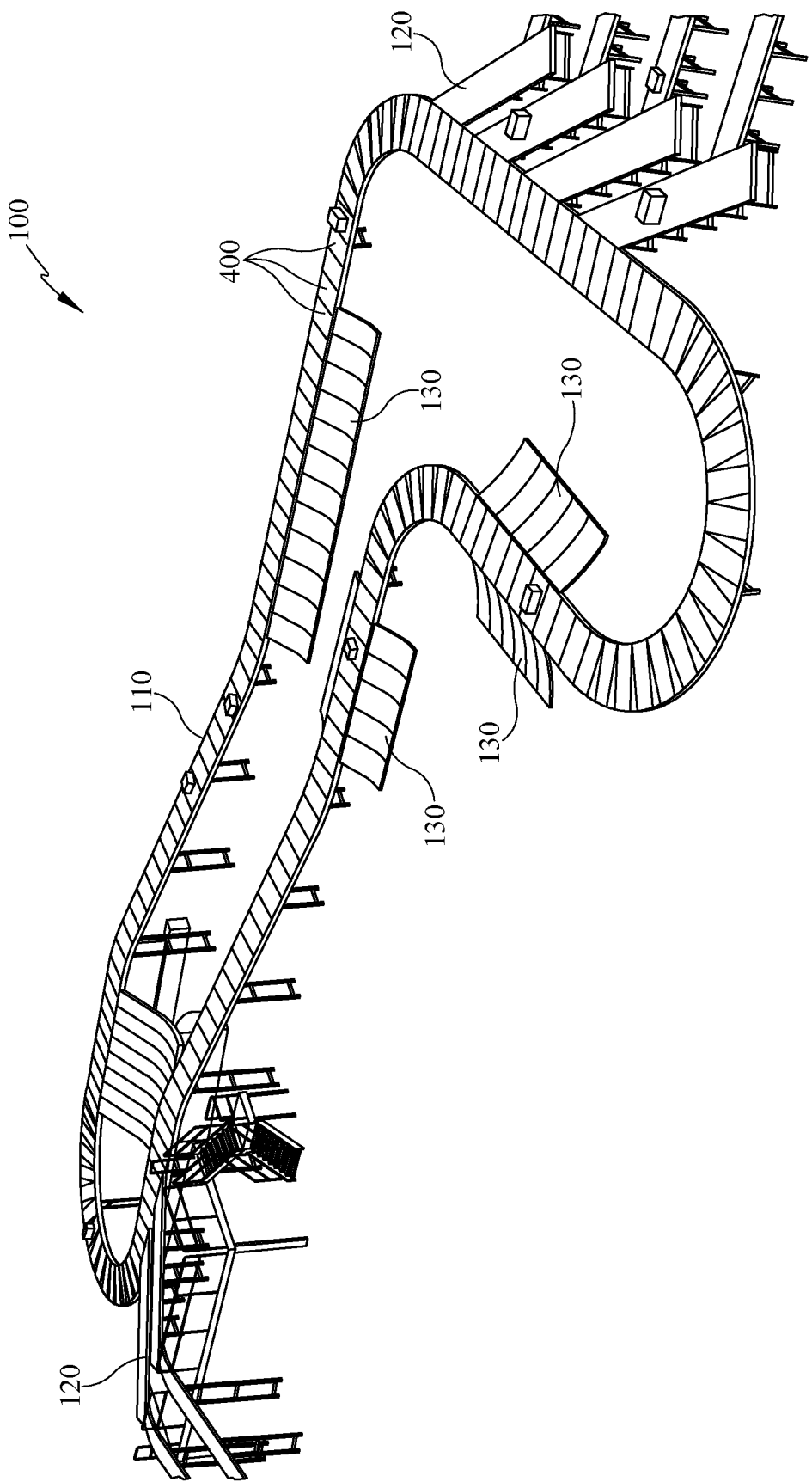
FIG. 1 is a perspective view of an exemplary conveyor system made in accordance with the present invention.

Referring first to FIG. 1, an exemplary conveyor system 100 made in accordance with the present invention comprises a track 110, which includes a variety of turns and changes in elevation. The conveyor system 100 further includes multiple carts 400 that move along the track 110 and one or more feeder belts 120 that provide parcels onto the carts 400. The carts 400 then deposit these parcels into one or more sorter bins 130.

Figure 2:
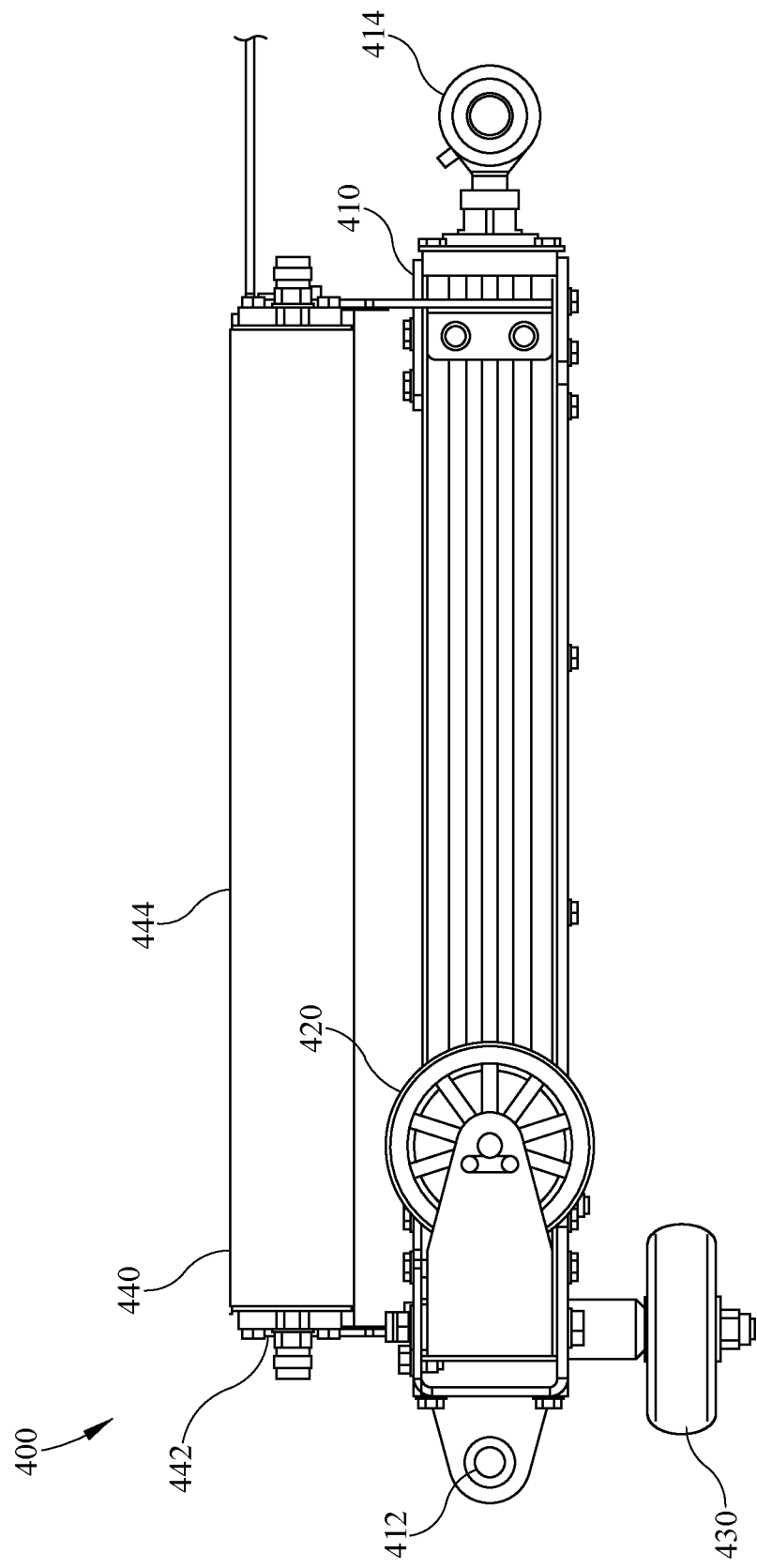
FIG. 2 is a side view of a cart of the conveyor system of FIG. 1 shown in isolation.
Figure 3:
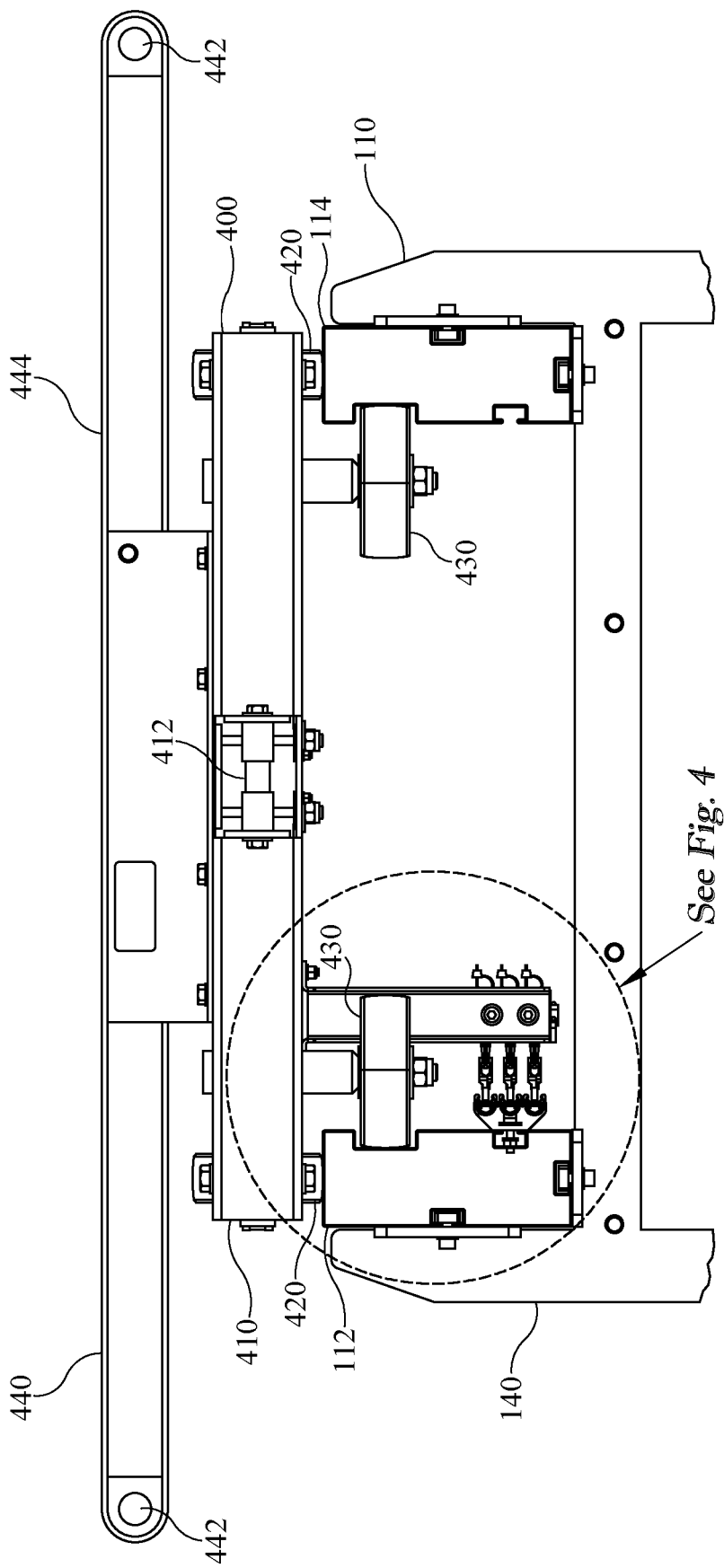
FIG. 3 is a cross-sectional view of a cart on the track of the conveyor system of FIG. 1.

Referring now to FIGS. 2 and 3, and with respect to the carts 400 of the present invention, an exemplary cart 400 includes a base 410 with a belt conveyor 440 connected to the top of the base 410. The belt conveyor 440 includes rollers 442 and a belt 444 which operate in a direction perpendicular to the direction of travel of the base 410 along the track 110. As such, while the cart 400 moves along the track 110, the conveyor 440 can readily accept parcels from the feeder belts 120 on either side of the cart 400 and deposit the parcels into the sorter bins 130 on either side of the cart 400.

The carts 400 in the exemplary conveyor system 100 are each connected by a spherical, or ball, joint which allows for rotation of one cart 400 relative to an adjacent cart 400 in three axis of rotation in order for the carts 400 to navigate the turns and changes in elevation of the track 110. To this end, the exemplary cart 400 includes a lateral pin 412 at one end of the cart 400 and a heim joint 414 (shown only in FIG. 2) at the other end of the cart 400. The lateral pin 412 of one cart 400 is configured for insertion through the heim joint 414 of an adjacent cart 400 to connect the two carts 400.

The cart 400 further includes vertical wheels 420 and horizontal wheels 430 which engage the track 110. In particular, as shown in FIG. 3, the track 110 includes a first (or inner) rail 112 and a second (or outer) rail 114 which run parallel to one another. A first set of wheels 420, 430 engages the first rail 112 and a second set of wheels 420, 430 similarly engages the second rail 114. In this way, the cart 400 is supported by the rails 112, 114 as it moves along the track 110. Each of the first and second rails 112, 114 is supported by a support frame 140, as discussed further below.

Figure 4:
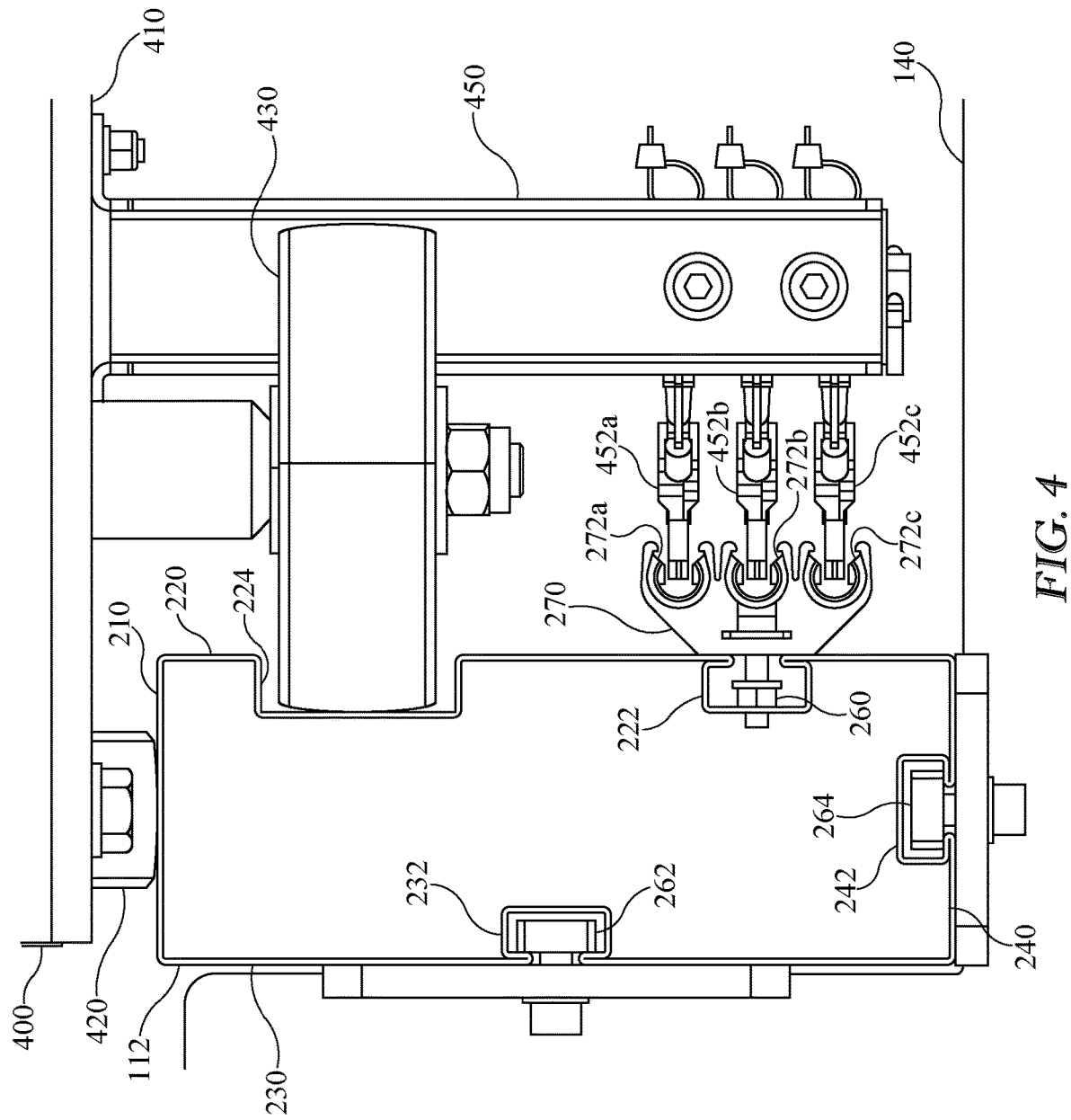
FIG. 4 is a detailed view of one of the rails of the track of FIG. 3.

Referring now to FIGS. 3 and 4, and with respect to the first rail 112 in particular, the exemplary first rail 112 includes a top panel 210, a first (or inner) side panel 220, a second (or outer) side panel 230, and a bottom panel 240, such that the first rail 112 defines a substantially enclosed inner space. A vertical wheel 420 of the cart 400 is supported by the top panel 210 of the first rail 112, and a horizontal wheel 430 of the cart 400 engages the first side panel 220. More specifically, the first side panel 220 defines a first (or wheel) channel 224 within which the horizontal wheel 430 of the cart 400 is retained.

Referring still to FIGS. 3 and 4, the cart 400 is also electrically connected to the first rail 112. In particular, the cart 400 further includes an arm 450 that extends downward from the base 410 of the cart 400. At the end of the arm 450 are multiple (three) current collectors 452a, 452b, 452c which engage a respective connector rail 272a, 272b, 272c extending around the track 110.

To this end, the first side panel 220 of the first rail 112 further defines a second (or bolt) channel 222 that extends along the length of the first rail 112. A clamp 270 is secured to the first rail 112 by a bolt 260 within the bolt channel 222. Each of the multiple (three) connector rails 272a, 272b, 272c is thereby secured to the first rail 112 by the clamp 270. Although not expressly shown, the connector rails 272a, 272b, 272c extend along substantially the entire length of the first rail 112 around the entirety of the track 110. Multiple clamps 270 are spaced along the length of the first rail 112 to adequately secure the connector rails 272a, 272b, 272c to the first rail 112. In one particular embodiment, the clamps 270 are spaced about one meter (1 m) apart along the track 110. Of course, the particular spacing of the clamps 270 can be modified according to the particular configuration and requirements of the track 110. In this way, as the cart 400 moves around the track 110, the current collectors 452a, 452b, 452c of the cart 400 remain in contact with the connector rails 272a, 272b, 272c to thereby maintain electrical communication between electronic devices on the cart 400 and external electronic devices, as discussed further below.

Similar to the first side panel 220, the second side panel 230 and the bottom panel 240 each define a respective bolt channel 232, 242 that extends along the length of the first rail 112 (i.e., around the track 110). In the embodiment shown in FIGS. 3 and 4, the bolt channels 232, 242 of the second side panel 230 and the bottom panel 240 are used to connect the first rail 112 to the support frame 140 of the conveyor system 100 with bolts 262, 264. However, the bolt channels 232, 242 of the second side panel 230 and the bottom panel 240 are also used to attach other accessories to the first rail 112, as discussed further below. In other words, the bolt channels 232, 242 provide a connection point to the first rail 112 along the entire length of the track 110.

The second rail 114 is substantially identical to the first rail 112, but a mirror image thereof. In the embodiment shown in FIG. 3, only the first rail 112 includes the clamp 270 and plurality of connector rails 272a, 272b, 272c. In other embodiments, however, the second rail 114 can also include a clamp and plurality of connector rails either instead of, or in addition to, the clamp 270 and plurality of connector rails 272a, 272b, 272c connected to the first rail 112.

Figure 5:
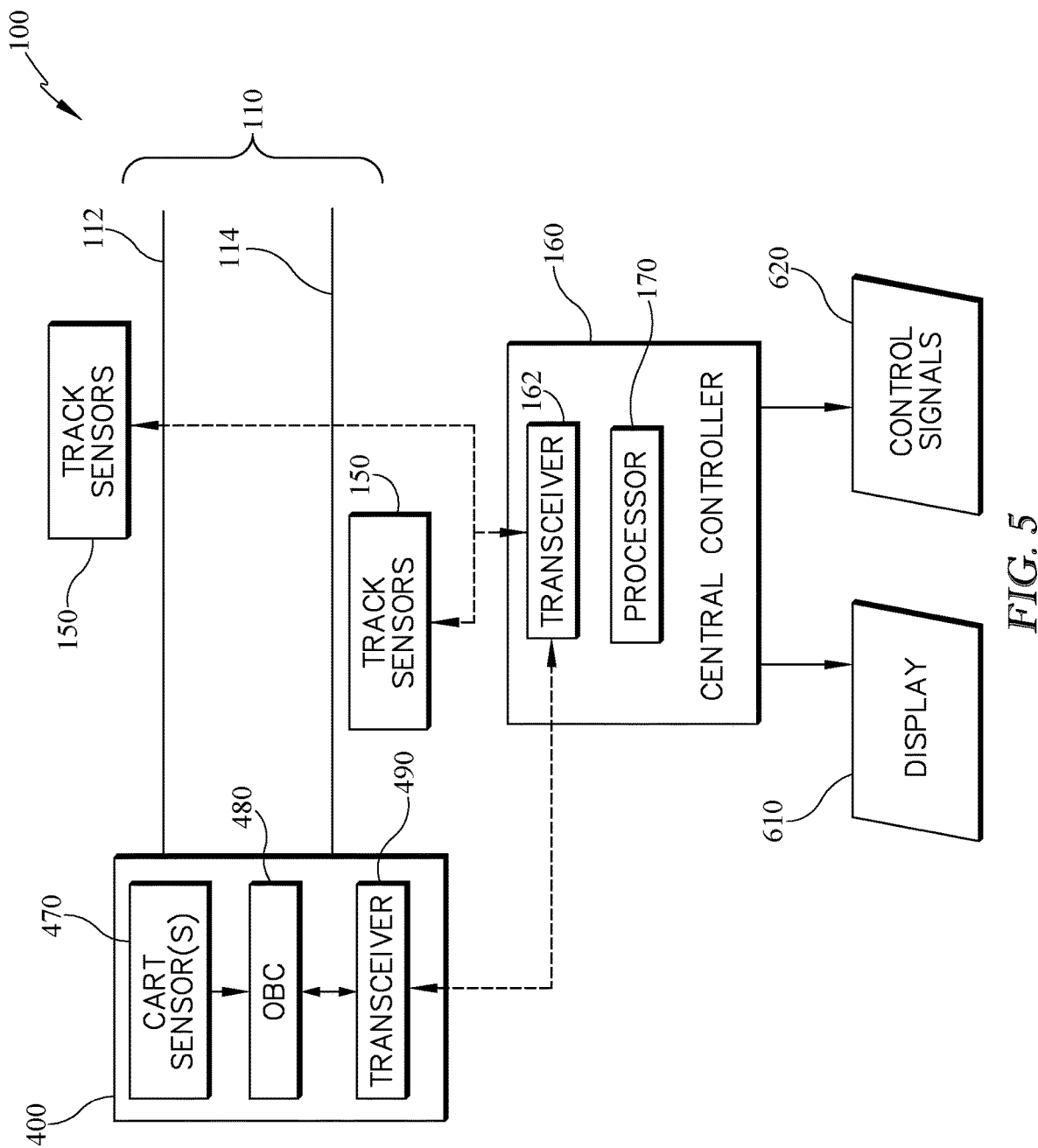
FIG. 5 is a schematic view of the conveyor system of FIG. 1.

Referring now to FIG. 5, in the exemplary conveyor system 100, the track 110 further includes a plurality of track sensors 150 operably connected to the first rail 112, the second rail 114, or both the first rail 112 and the second rail 114. The position of the track sensors 150 along the track 110 is not limited as the track sensors 150 can be positioned on straight sections of the track 110, curved sections of the track 110, and inclined sections of the track 110. The track sensors 150 are not only able to measure vibrations of the rail 112, 114 that the track sensor 150 is connected to but also to the other rail 112, 114. As previously mentioned, the first and second rails 112, 114 are supported by a support frame 140. The support frame 140 provides sufficient mechanical connection between the first rail 112 and the second rail 114 that vibrations originating on one rail will transfer to the other rail. Furthermore, in some embodiments, the track sensors 150 are operably connected to the support frame 140 itself in a location between the two rails 112, 114.

In some embodiments, the track sensors 150 are operably connected to the bolt channels of the first and second rails 112, 114, as described above with respect to the bolt channels 232, 242 of the first rail 112. In some preferred embodiments, the track sensors 150 are placed directly on the channels of the rails 112, 114.

In any event, the track sensors 150 are preferably spaced along the track in substantially equal intervals. For example, in one particular embodiment, the track sensors 150 are each spaced about twenty-four meters (24 m) apart along the length of the track 110. Of course, the particular spacing of the track sensors 150 can be modified according to the particular configuration and requirements of the track 110. In one particular embodiment, only two track sensors 150 are included, which are located equidistant along the track 110. Regardless of the number or placement of the track sensors 150, it is contemplated that the track sensors 150 are preferably able to monitor vibrations along the entire length of the track 110.

Referring still to FIG. 5, the exemplary conveyor system 100 further includes a central controller 160 that receives and collects data from the plurality of track sensors 150. In particular the central controller 160 includes a transceiver 162 to send and receive data between the track sensors 150 and the central controller 160 and a processor 170 which then analyzes the data, as discussed further below. In some embodiments, the conveyor system 100 includes multiple controllers 160 with each of the controllers 160 collecting data from a specific subset of track sensors 150.

Referring still to FIG. 5, the exemplary cart 400 further includes one or more cart sensors 470. One exemplary cart sensor 470 is a tri-axial accelerometer which measures acceleration, or G-forces, experienced by the cart 400. Another exemplary cart sensor 470 is a force sensor positioned at the joint (either the lateral pin 412 or the heim joint 414) between two adjacent carts 400 to measure the thrust forces experienced at the joint. For example, multiple strain gauges can be positioned around the joint to acquire the thrust forces experienced at the joint in all directions (e.g., longitudinal, lateral, vertical, and any combination thereof). Yet another exemplary cart sensor 470 is a gyroscope configured to measure the oscillation of the cart 400.

The exemplary cart 400 further includes an on-board controller (OBC) 480 that collects data from the one or more cart sensors 470. A transceiver 490 is used to send and receive information between the OBC 480 and the central controller 160. For example, in the exemplary cart 400 described above, the current collectors 452a, 452b, 452c of the cart 400 and the connector rails 272a, 272b, 272c secured to the first rail 112 are used to transmit data between the transceiver 490 of the cart 400 and the central controller 160, but other forms of data transmission are also contemplated without departing from the spirit and scope of the present invention.

Figure 6A:
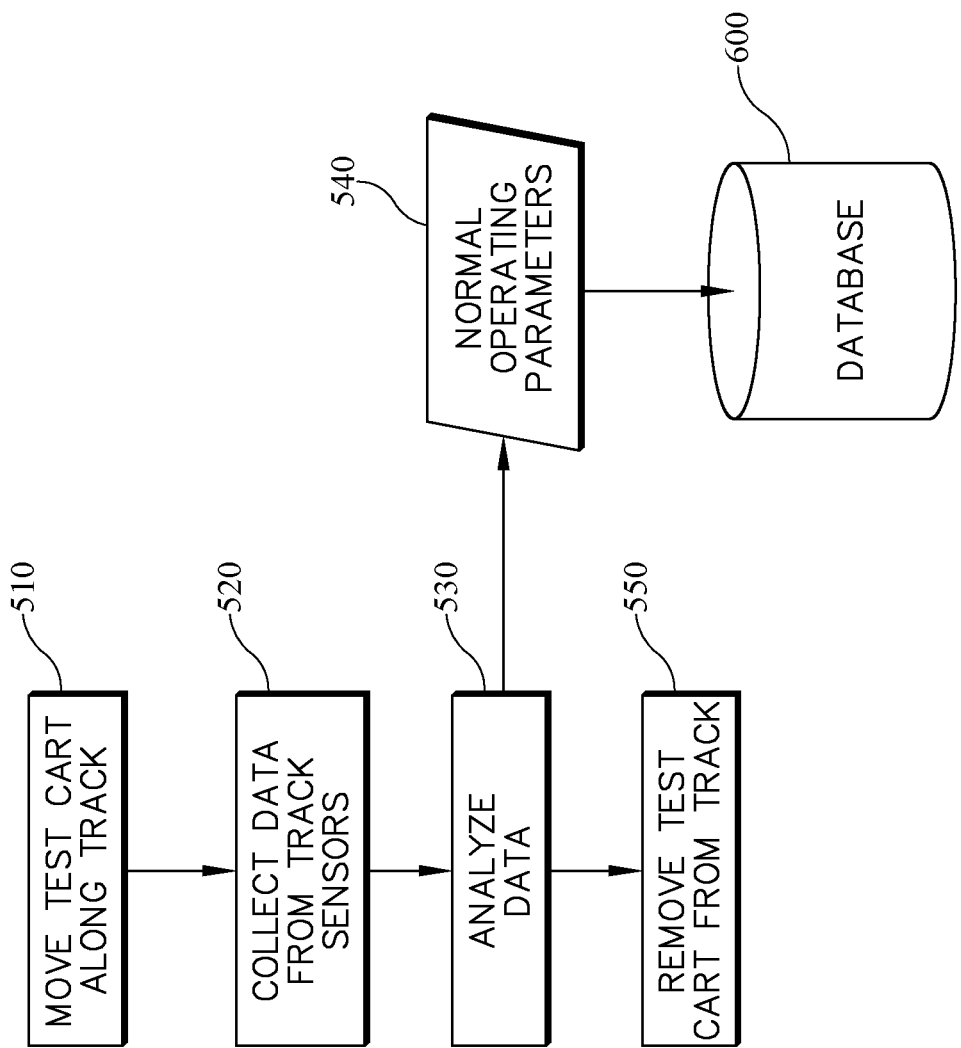
FIG. 6A is a flow chart illustrating the collection and analysis of data in the conveyor system of FIG. 1 according to one exemplary implementation of the present invention.

Referring now to FIG. 6A, in one exemplary implementation of operating the conveyor system 100 of the present invention, in an initial step 510, a test cart 400 is positioned on the track 110 and moved along the track 110. In some embodiments, the test cart 400 is substantially identical to other carts 400 but includes additional testing equipment which is not provided on the carts 400 during normal operation. As such, providing the test cart 400 is accomplished by simply placing the testing equipment on one or more of the carts 400 of the conveyor system 100.

While the test cart 400 moves along the track 110, data from the track sensors 150 on the first and second rails 112, 114 of the track 110 is received via the transceiver 162 and collected by the central controller 160 in step 520.

In step 530, the data from the track sensors 150 is then analyzed by the processor 170. In particular, a predetermined range of frequencies of vibrations of the track 110 (i.e., the first and second rails 112, 114) caused by the test cart 400 moving along the track 110 under normal operation is determined. The particular range of frequencies caused by the test cart 400 moving along the track 110 under normal operation can differ depending on the location of the cart 400 along the track 110. As such, a different predetermined range of frequencies of vibrations of the track 110 can be established for various portions of the track 110, such as straight portions of the track 110, curved portions of the track 110, and inclined portions of the track 110. Each of the track sensors 150 remains in substantially the same location along the track 110, and so, for each track sensor 150, a predetermined range of frequencies of vibrations of the track 110 caused by the test cart 400 moving along the track 110 under normal operation is determined. In other words, every track sensor 150 may have its own predetermined range of frequencies of vibrations of the track 110 caused by the test cart 400 moving along the track 110 under normal operation.

For each of the track sensors, the predetermined range of frequencies of vibrations of the track 110 caused by the test cart 400 moving along the track 110 under normal operation is then stored as normal operating parameters 540 in a database 600. This database 600 may be part of the central controller 160 or located separate from the central controller 160 and in communication with the central controller 160. For example, in some embodiments, the database 600 is part of the track sensors 150 themselves and the normal operating parameters 540 for each track sensor 150 are stored directly in the track sensor 150.

In step 550, the test cart 400 is then removed, and one or more operational carts 400 are positioned on the track 110. In embodiments where the test cart 400 is substantially identical to the operational carts 400 but includes additional testing equipment, removing the test cart 400 is accomplished by simply removing the testing equipment from the cart 400.

Figure 6B:
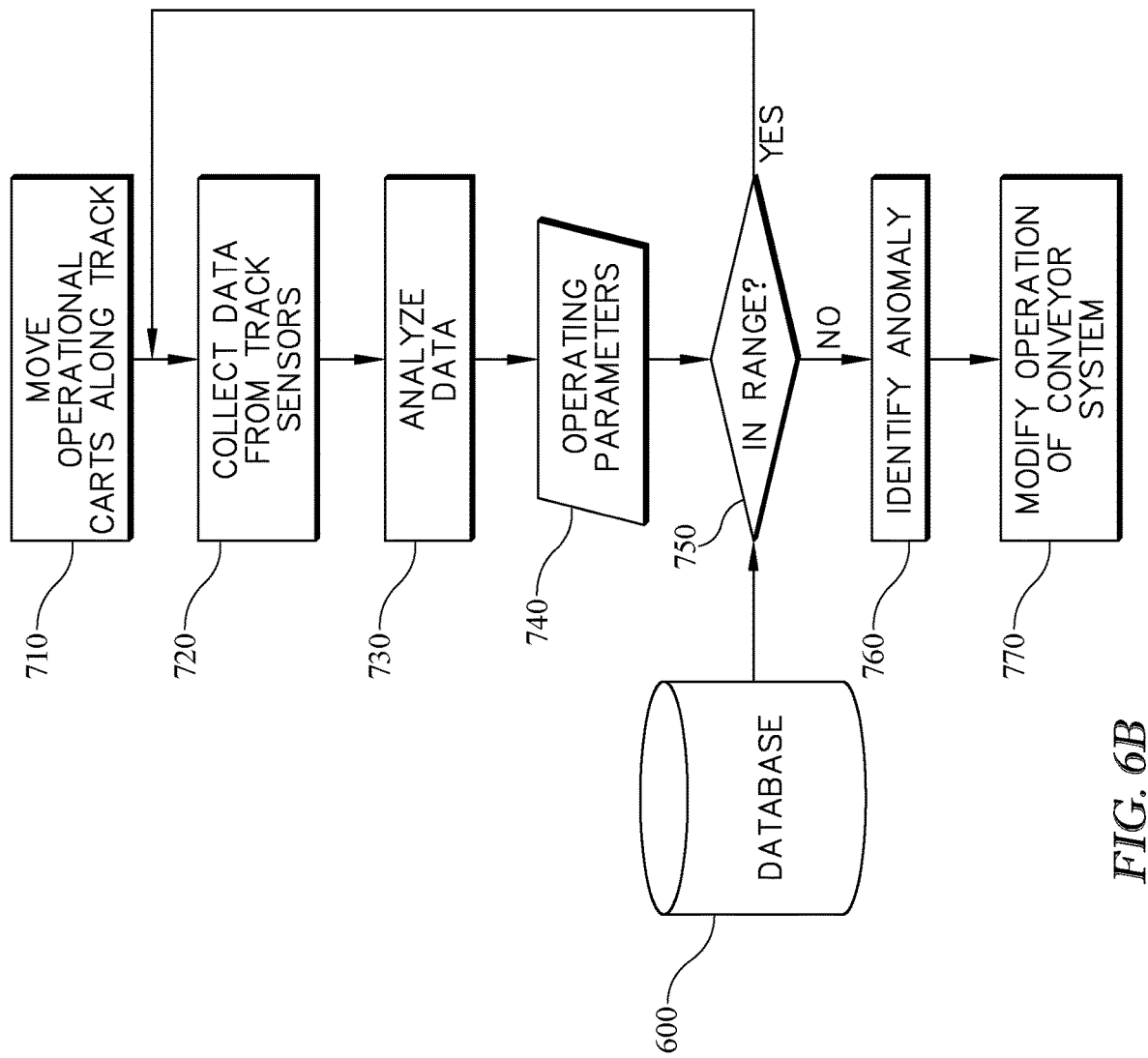
FIG. 6B is a flow chart illustrating the monitoring of the conveyor system of FIG. 1 according to one exemplary implementation of the present invention.

Referring now to FIG. 6B, in step 710, the one or more operational carts 400 are then moved along the track 110 in normal operation of the conveyor system 100.

While the operational carts 400 move along the track 110, data from the track sensors 150 on the first and second rails 112, 114 of the track 110 is received via the transceiver 162 and collected by the central controller 160 in step 720.

In step 730, the data from the track sensors 150 is then analyzed by the processor 170 to determine the current operating parameters 740 for each of the track sensors 150.

In step 750, the normal operating parameters 540 for each of the track sensors 150 determined in step 530 and stored in the database 600 is compared to the current operating parameters 740 for each of the track sensors 150 to determine whether the current operating parameters 740 are in range of the normal operating parameters 540, and therefore, whether the conveyor system 100 is operating normally. In particular, the processor 170 compares the analyzed vibration data from the track sensors 150 with the predetermined range of frequencies of vibration stored in the database 600 to determine whether the frequency of the vibrations is within the predetermined range of frequencies of vibrations.

If the current operating parameters 740 are in range of the normal operating parameters 540, then data continues to be collected from the track sensors 150 and analyzed as described above.

However, if the current operating parameters 740 are not in range of the normal operating parameters 540, then in step 760, an anomaly in the conveyor system 100 is identified by the processor 170. For example, in some exemplary implementations of the present invention, when the vibrations of the track 110 are outside of the predetermined range, at least one of the operational carts 400 is presumed to have experienced a mechanical fault. One such mechanical fault is a sudden impact experienced by the operational cart 400. For example, some exemplary mechanical faults which can be detected include an impact of an external object and the operational cart 400, an external object and the track 110, an impact between two adjacent operational carts 400, or a fault with the wheel of the cart 400. Furthermore, depending on which of the track sensors 150 are reporting vibrations outside of the range of the normal operating parameters 540, the processor 170 is able to determine a location of the mechanical fault. For example, if two track sensors 150 both indicate that a mechanical fault has occurs, the processor 170 can determine that the mechanical fault occurred in an area of the track 110 between these two track sensors 150.

In some embodiments, the track sensors 150 are connected in pairs along the length of the track 110. For each pair of track sensors 150, a first track sensor 150 is operably connected to the first rail 112 at a location along the track 110, and a second track sensor 150 is operably connected to the second rail 114 at the same location along the track 110, such that a cart 400 passes the pair of sensors 150 at substantially the same time. In such a configuration, the data from the first track sensor 150 on the first rail 112 can be compared to the data from the second track sensor 150 on the second rail 114. If there is a difference between the measured vibrations of the first and second rails 112, 114, the processor 170 can determine that a mechanical fault exists which is particular to one set of wheels 420, 430 of the cart 400 (i.e., a first set of wheels 420, 430 that engages the first rail 112 or a second set of wheels 420, 430 that engages the second rail 114).

After identifying an anomaly in the conveyor system 100, the operation of the conveyor system 100 is modified in step 770 to correct or mitigate the issue. In some embodiments, the processor 170 reports the anomaly to a user, for example with an alert on a display 610, as shown in FIG. 5. The user can then modify operation of the conveyor system 100 as needed. In some other embodiments, the processor 170 provides control signals 620 to automatically correct operation and maintain safe operation of the conveyor system 100, as also shown in FIG. 5.

Figure 7A:
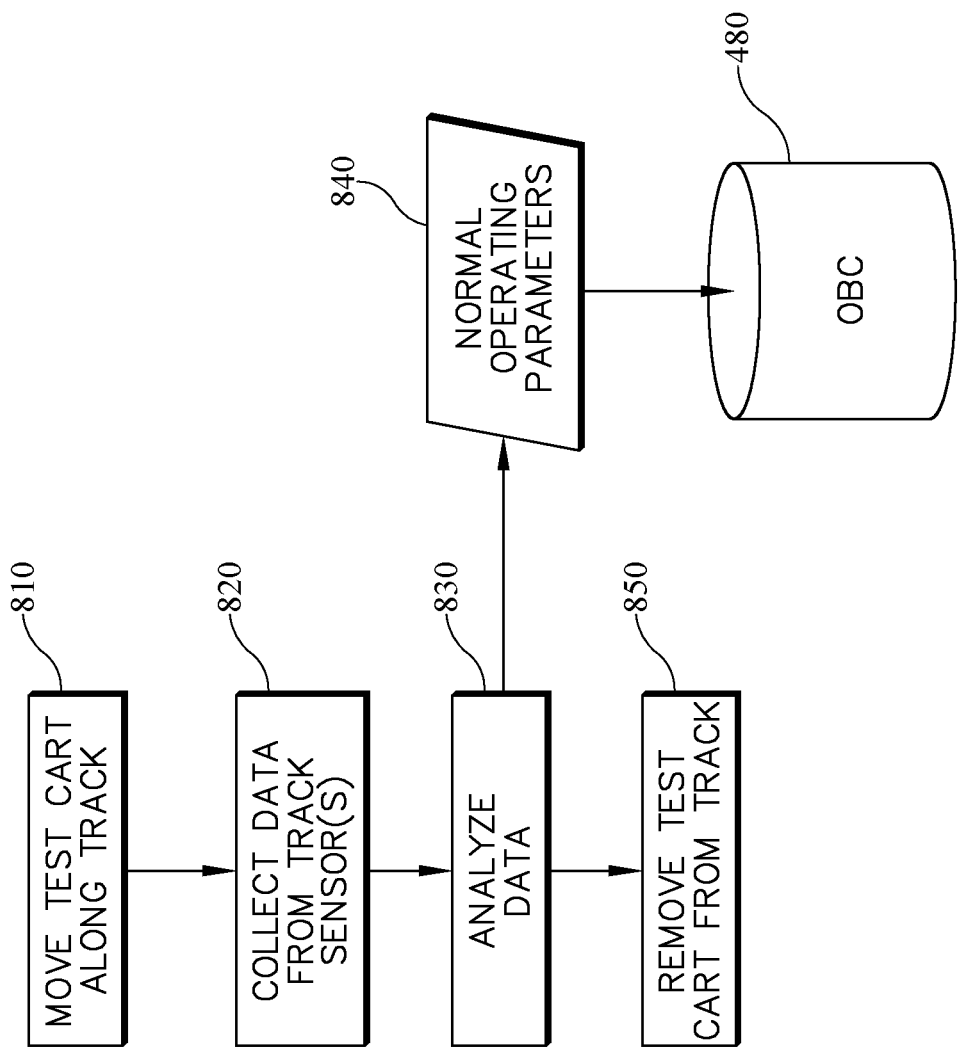
FIG. 7A is a flow chart illustrating the collection and analysis of data in the conveyor system of FIG. 1 according to another exemplary implementation of the present invention.

Referring now to FIG. 7A, in another exemplary implementation of operating the conveyor system 100 of the present invention, in an initial step 810, a test cart 400 is positioned on the track 110 and moved along the track 110. As mentioned above, in some embodiments, the test cart 400 is substantially identical to other carts 400 but includes additional testing equipment which is not provided on the carts 400 during normal operation. As such, providing the test cart 400 is accomplished by simply placing the testing equipment on one or more of the carts 400 of the conveyor system 100. In particular, the test cart 400 preferably includes as cart sensors 470 at least the accelerometer, strain gauges, and gyroscope previously mentioned.

While the test cart 400 moves along the track 110, data from the cart sensors 470 on the test cart 400 is collected in step 820. In particular, the accelerometer measures acceleration experienced by the cart 400, the strain gauges measures the thrust forces experienced at the joint as the cart 400 is accelerated up to a maximum speed, and the gyroscope measures the oscillation of the cart 400. The data from the cart sensors 470 as the test cart 400 moves along the track 110 is collected and received by the OBC 480. The data is then transmitted via the transceiver 490 and received by the central controller 160.

Figure 8:
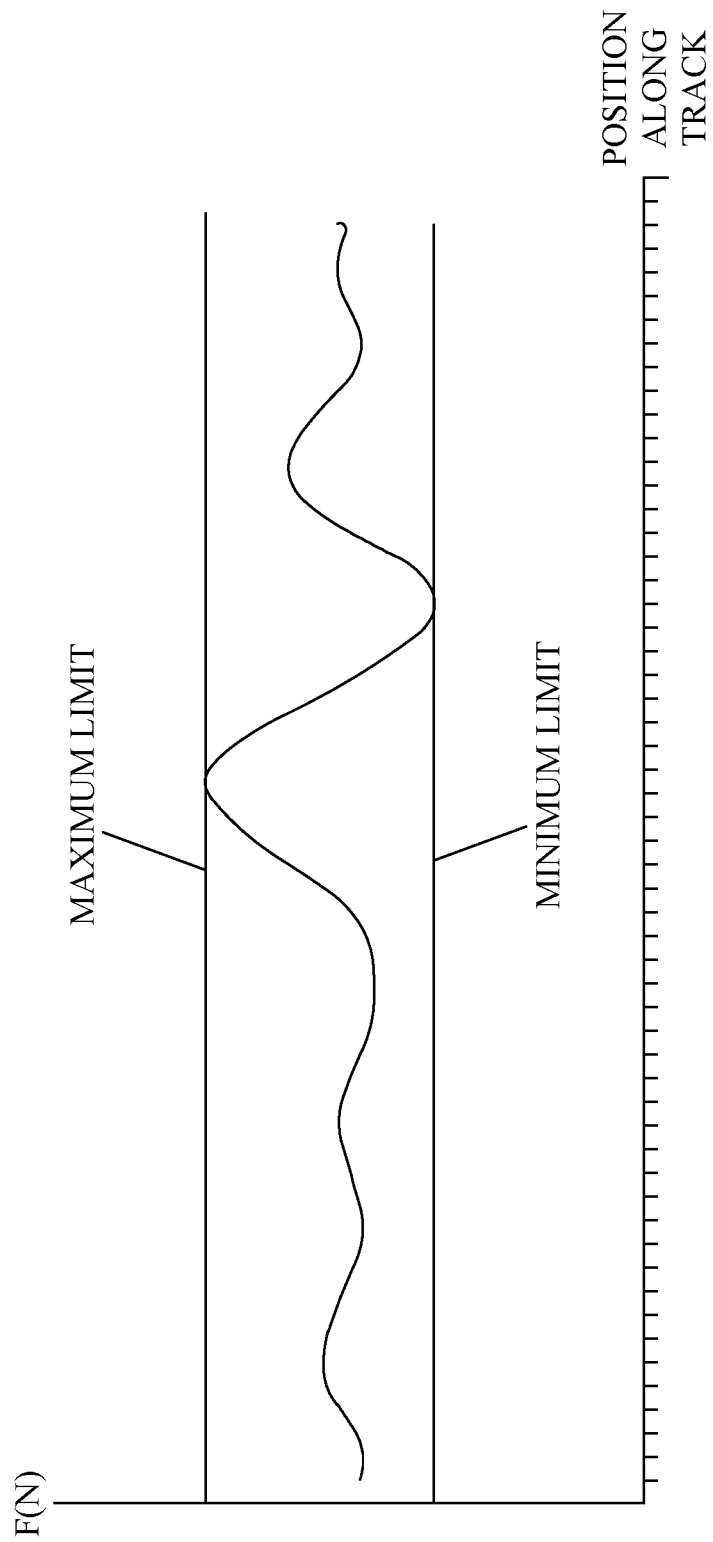
FIG. 8 illustrates an exemplary vibration measurement of a track sensor as a single operational cart moves along the track.

In step 830, the data from the cart sensors 470 is then analyzed by the processor 170. In particular, a predetermined range of acceleration forces experienced by the test cart 400 is determined based on the data collected from the accelerometer cart sensor 470. FIG. 8 is a graph of exemplary acceleration force measurements taken by an accelerometer cart sensor 470 as a test cart 400 moves along the track 110. The maximum safe limit and the minimum safe limit of the acceleration force data are indicated on the graph. Likewise, a predetermined range of thrust forces experienced at the joint of the test cart 400 is determined based on the data collected from the strain gauge cart sensors 470, and a predetermined range of oscillations of the test cart 400 is determined based on the data collected from the gyroscope cart sensor 470.

The results of the analysis is then stored as normal operating parameters 840 in the OBC 480 of each of the operational carts 400. That is to say, once the processor 170 has determined the normal operating parameters 840 of the test cart 400, the normal operating parameters 840 are transmitted to the OBC 480 of each of the operational carts 400 via the transceivers 490.

In step 850, the test cart 400 is then removed, and one or more operational carts 400 are positioned on the track 110. Once again, in embodiments where the test cart 400 is substantially identical to the operational carts 400 but includes additional testing equipment, removing the test cart 400 is accomplished by simply removing the testing equipment from the cart 400. In some embodiments, each of the operational carts 400 still includes at least the accelerometer cart sensor 470 and the gyroscope cart sensor 470, but only a first operational cart 400 of the conveyor system 100 includes the strain gauge cart sensors 470 at the joint between the first operational cart 400 and a second, successive operational cart 400.

Figure 7B:
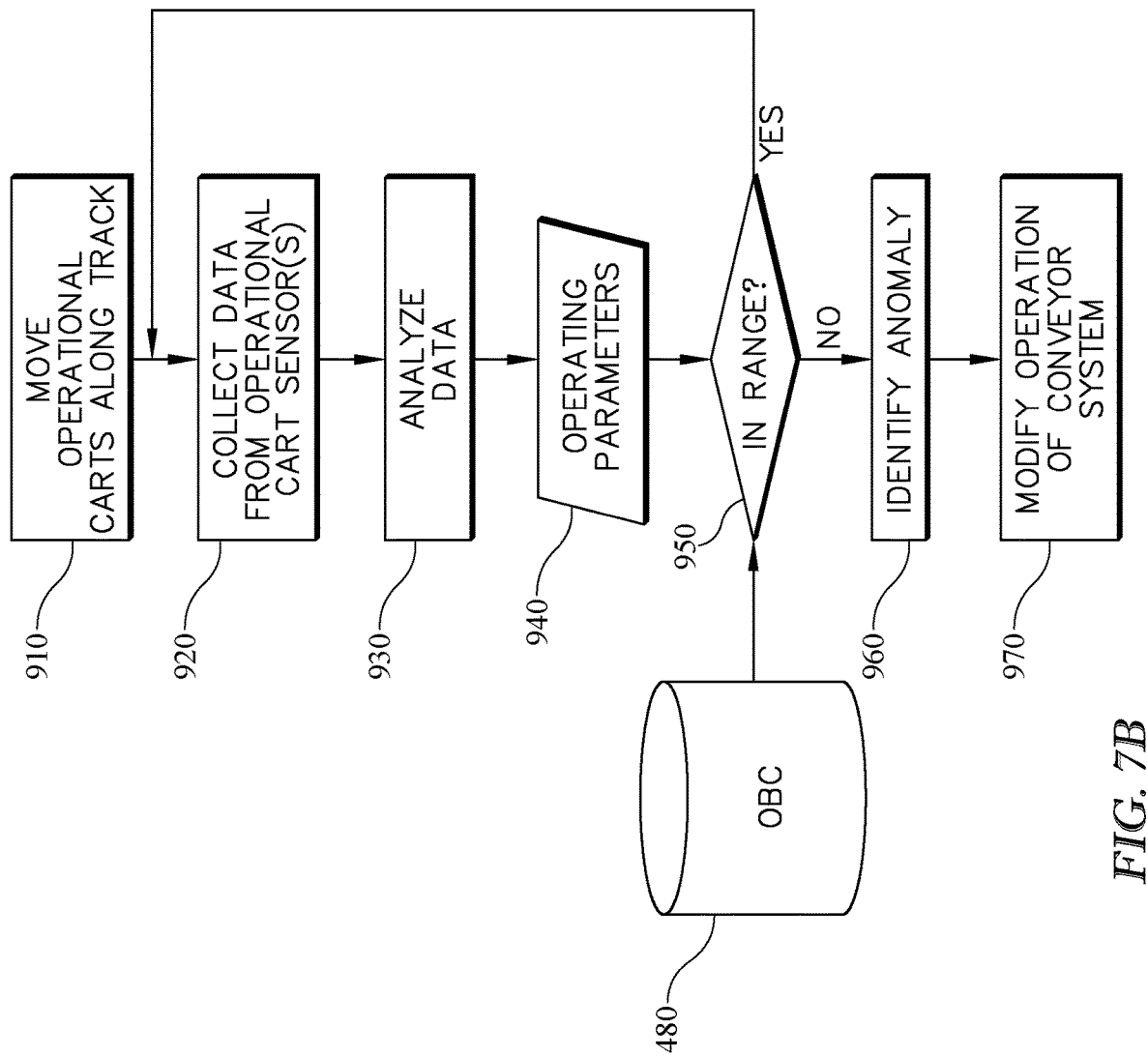
FIG. 7B is a flow chart illustrating the monitoring of the conveyor system of FIG. 1 according to another exemplary implementation of the present invention.

Referring now to FIG. 7B, in step 910, the one or more operational carts 400 are then moved along the track 110 in normal operation of the conveyor system 100.

While the operational carts 400 move along the track 110, data from the cart sensors 470 on the operational carts 400 is collected in step 920. More specifically, as the operational carts 400 move along the track 110, data from the cart sensors 470 is collected and received by the OBC 480.

In step 930, for each of the operational carts 400, the data from the cart sensors 470 is then analyzed by the OBC 480 to determine the current operating parameters 940 of the cart 400.

In step 950, the OBC 480 compares the current operating parameters 940 of the cart 400 with the normal operating parameters 840 determined in step 830 and stored in the OBC 480 to determine whether the current operating parameters 940 are in range of the normal operating parameters 840, and therefore, whether the conveyor system 100 is operating normally. In other words, the OBC 480 collects data from the one or more cart sensors 470 to determine whether measurements taken of the operational cart 400 as the operational cart 400 moves along the track 110 are within a predetermined range of values that corresponds to normal operation of the conveyor system 100.

In particular, the OBC 480 compares the analyzed acceleration forces from the accelerometer cart sensor 470 of the operational cart 400 with the predetermined range of acceleration forces stored in the OBC 480 from analysis of the test cart 400 to determine whether the acceleration forces are within the predetermined range of acceleration forces of the cart. Likewise, the OBC 480 compares the analyzed oscillations experienced by the operational cart 400 from the gyroscope cart sensor 470 of the operational cart 400 with the predetermined range of oscillations stored in the OBC 480 from analysis of the test cart 400 to determine whether the oscillations are within the predetermined range of oscillations of the operational cart 400. Also, the OBC 480 of the first operational cart 400 compares the analyzed thrust forces experienced at the joint of the first operational cart 400 from the strain gauge cart sensors 470 of the first operational cart 400 with the predetermined range of thrust forces stored in the OBC 480 from analysis of the test cart 400 to determine whether the thrust forces are within the predetermined range of thrust forces of the operational cart 400.

If the current operating parameters 940 are in range of the normal operating parameters 540, then data continues to be collected from the cart sensors 470 and analyzed as described above.

If the current operating parameters 940 are not in range of the normal operating parameters 840, in step 960, an anomaly in the conveyor system 100 is identified. For example, in some exemplary implementations of the present invention, when the acceleration forces experienced by an operational cart 400 are outside of the predetermined range, the operational carts 400 is presumed to have experienced a mechanical fault. One such mechanical fault is a sudden impact experienced by the operational cart 400, for example, colliding with another cart 400. Other anomalies related to the joint of the carts 400 can likewise be determined based on the thrust forces and/or oscillations experienced by the operational cart 400. In some embodiments, when the OBC 480 determines that the current operating parameters 940 are not in range of the normal operating parameters 840, the OBC 480 communicates via the transceiver 490 with the central controller 160 and the anomaly is identified by the processor 170. In other embodiments, the OBC 480 identifies the anomaly.

After identifying an anomaly in the conveyor system 100, the operation of the conveyor system 100 is modified in step 970 to correct or mitigate the issue in substantially the same manner as in step 770 described above.

In addition to the accelerometer, strain gauges, and gyroscope described above, an exemplary cart 400 may include a variety of other cart sensors 470. One such exemplary cart sensor 470 measures the temperature of the motor that rotates the rollers 442 of the belt conveyor 440. Likewise, in some particular embodiments in which one of the rollers 442 is a direct drive roller (DDR) and the other roller 442 is a driven roller, one exemplary cart sensor 470 measures the speed of the DDR, and another exemplary cart sensor 470 measures the speed of the driven roller. If the DDR moves at a speed different than the driven roller, it can be determined that tension in the belt 444 is not proper. Other exemplary cart sensors 470 measure the voltage and current of the current collectors 452a, 452b, 452c and other similar statuses of the various components of the cart 400. It is contemplated that the OBC 480 collects data from each of these cart sensors 470 and analyzes the data to identify if there is an anomaly in any of the corresponding parts of the cart 400 which are monitored by these additional cart sensors 470. These sensors can also provide information regarding use of the conveyor 440 for loading, unloading, and centering of a parcel on the cart 400.

In some embodiments, at least some of the cart sensors 470 and/or the track sensors 150 are microelectromechanical systems (MEMS), but the configuration of any particular sensor is not limited.

One of ordinary skill in the art will also recognize that additional embodiments and implementations are also possible without departing from the teachings of the present invention. This detailed description, and particularly the specific details of the exemplary embodiments and implementations disclosed therein, is given primarily for clarity of understanding, and no unnecessary limitations are to be understood therefrom, for modifications will become obvious to those skilled in the art upon reading this disclosure and may be made without departing from the spirit or scope of the present invention.

What is claimed is:

1. A conveyor system including a cart that moves along a track, the system comprising:
    a rail that supports the cart as it moves along the track;
    a plurality of sensors operably connected to the rail, the plurality of sensors configured to measure vibrations of the rail as the cart moves along the track; and
    a central controller that collects data from the plurality of sensors, including a processor configured to analyze the data to determine whether a frequency of the vibrations is within a predetermined range that corresponds to normal operation of the conveyor system;
    wherein the conveyor system includes an inner rail and an outer rail, and the plurality of sensors includes a pair of sensors, with a first sensor operably connected to the inner rail at a location along the track and a second sensor operably connected to the outer rail at the same location along the track, such that the cart passes the pair of sensors at substantially the same time; and
    wherein the processor compares the data collected from the first sensor to the data collected from the second sensor to identify if an anomaly exists at only one side of the cart.

2. The conveyor system of claim 1, wherein, when the frequency of the vibrations is outside of the predetermined range, the central controller reports that the cart has experienced a mechanical fault.

3. The conveyor system of claim 1, wherein, when the frequency of the vibrations is outside of the predetermined range, the central controller reports that the cart has experienced an impact.

4. The conveyor system of claim 1, wherein the sensors of the plurality of sensors are spaced along the track at substantially equal intervals.

5. The conveyor system of claim 1, wherein multiple carts move along the track, and wherein, when the frequency of the vibrations is outside of the predetermined range, at least one of the multiple carts is presumed to have experienced a mechanical fault, and the processor is configured to determine a location of the at least one of the multiple carts that experienced the mechanical fault.

6. A conveyor system including a cart that moves along a track, the system comprising:
    a rail that supports the cart as it moves along the track;
    a plurality of sensors operably connected to the rail, the plurality of sensors configured to measure vibrations of the rail as the cart moves along the track; and
    a central controller that collects data from the plurality of sensors, including a processor configured to analyze the data to determine whether a frequency of the vibrations is within a predetermined range that corresponds to normal operation of the conveyor system;
    wherein the cart includes one or more cart sensors and an on-board controller, wherein the on-board controller collects data from the one or more cart sensors to determine whether measurements taken of the cart as the cart moves along the track are within a predetermined range of values that corresponds to normal operation of the conveyor system.

7. The conveyor system of claim 6, wherein the one or more cart sensors include at least one of:
    an accelerometer which measures acceleration forces experienced by the cart as the cart moves along the track;
    strain gauges positioned at a joint between the cart and an adjacent cart which measure thrust forces experienced at the joint as the cart moves along the track; and
    a gyroscope which measures oscillations experienced by the cart as the cart moves along the track.

8. The conveyor system of claim 6, wherein the central controller collects data from the one or more cart sensors on the cart to define the predetermined range of values that corresponds to normal operation of the conveyor system.

9. A method of operating a conveyor system that includes a rail, the method comprising the steps of:
    providing a plurality of sensors on the rail that are configured to measure vibrations of the rail;
    providing a test cart that includes one or more cart sensors configured to take measurements of the test cart;
    moving the test cart along the rail while collecting data from the one or more cart sensors on the test cart and collecting data from the plurality of sensors on the rail;
    analyzing the data from the plurality of sensors on the rail to define a predetermined range of frequencies of vibrations of the rail that correspond to the test cart moving along the rail under normal operation;
    analyzing the data from the one or more cart sensors on the test cart to define a predetermined range of values that correspond to the test cart moving along the rail under normal operation;
    providing an operational cart that includes one or more cart sensors configured to take measurements of the operational cart and moving the operational cart along the rail;
    analyzing data from the plurality of sensors on the rail as the operational cart moves along the rail to determine whether the frequency of the vibrations of the rail is within the predetermined range of frequencies of vibrations of the rail; and
    analyzing data from the one or more cart sensors on the operational cart as the operational cart moves along the rail to determine whether the measurements taken of the operational cart are within the predetermined range of values.

10. The method of claim 9, wherein a central controller receives the data from the plurality of sensors on the rail to define the predetermined range of frequencies of vibrations of the rail and receives the data from the one or more cart sensors on the test cart to define the predetermined range of values.

11. The method of claim 10, wherein the central controller determines whether the frequency of the vibrations of the rail is within the predetermined range of frequencies of vibrations of the rail; and
    wherein an on-board controller on the operational cart receives the data from the one or more cart sensors on the operational cart as the operational cart moves along the rail to determine whether the measurements taken of the operational cart are within the predetermined range of values.

12. The method of claim 9, further comprising a step of removing the test cart such that only the operational cart moves along the rail.

13. The method of claim 9, wherein a plurality of operational carts are provided and simultaneously moved along the rail.

14. The method of claim 13, wherein, when the frequency of the vibrations is outside of the predetermined range of frequencies of vibrations of the rail, at least one of the plurality of operational carts is presumed to have experienced a mechanical fault, and further comprising a step of determining a location of the at least one of the plurality of operational carts that experienced the mechanical fault.

15. The method of claim 9, wherein the one or more cart sensors including at least one of:
- an accelerometer which measures acceleration forces;
- strain gauges positioned at a joint between the cart and an adjacent cart which measure thrust forces experienced at the joint; and
- a gyroscope which measures oscillations experienced by the cart.

\* \* \* \* \*